F. G. KEYES.
CATALYTIC SYNTHESIS OF ORGANIC SUBSTITUTION PRODUCTS.
APPLICATION FILED JAN. 13, 1914.

1,237,652.

Patented Aug. 21, 1917.
2 SHEETS—SHEET 1.

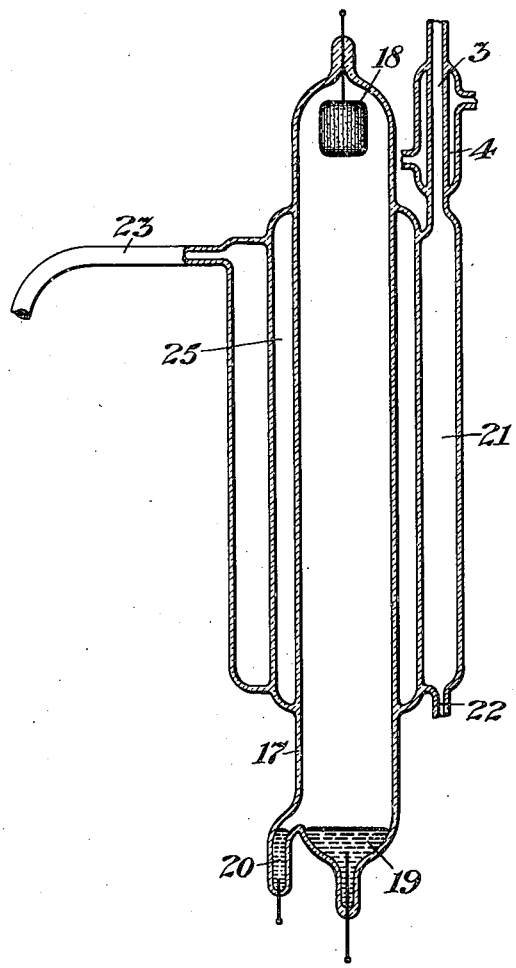

UNITED STATES PATENT OFFICE.

FREDERICK G. KEYES, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

CATALYTIC SYNTHESIS OF ORGANIC SUBSTITUTION PRODUCTS.

1,237,652.  Specification of Letters Patent.  Patented Aug. 21, 1917.

Original application filed July 25, 1913, Serial No. 781,049. Divided and this application filed January 13, 1914. Serial No. 811,816.

*To all whom it may concern:*

Be it known that I, FREDERICK G. KEYES, a citizen of the United States, and resident of East Orange, county of Essex, State of New Jersey, have invented certain new and useful Improvements in Catalytic Synthesis of Organic Substitution Products, of which the following is a specification.

My invention relates to methods of forming organic compounds and more particularly to a convenient method of catalyzing or stimulating certain reactions which take place sluggishly or not at all under the conditions of ordinary manipulation. In carrying out my process I may rely upon certain energizing means such as electrically excited quartz tubes containing mercury vapor or some suitable gas for producing the radiation by electrical means.

I have illustrated one application of the invention in connection with certain derivatives of benzene or compounds of benzene which has the formula $C_6H_6$. For one or more of the hydrogen atoms of the benzene I may substitute $CH_3$ and may replace (by my process) two of the latter atoms of hydrogen with bromin. For example to produce dibrom-xylene I may mix bromin with the benzene derivative and expose the mixture to the effect of the radiation from the quartz mercury vapor tube which catalyzes the reaction with a copious evolution of gaseous hydrogen bromid the dibrom compound remaining behind. This process proceeds ordinarily only in sun-light and then very slowly, but with my use of the radiation from a quartz lamp, catalyzing takes place with tremendously greater rapidity and certainty. The particular materials here chosen are merely illustrative of my general method, and my invention is broad enough to cover the application of catalyzing radiations to chemical synthesis in connection with a mercury vapor apparatus; neither is the quartz a necessity in producing these results, though quartz is often advantageous.

Figure 1:
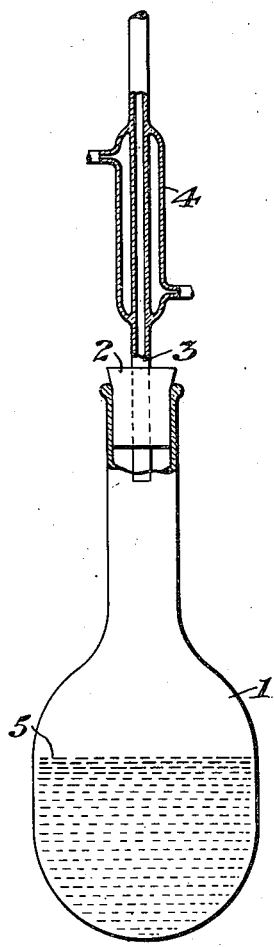
Figure 2:
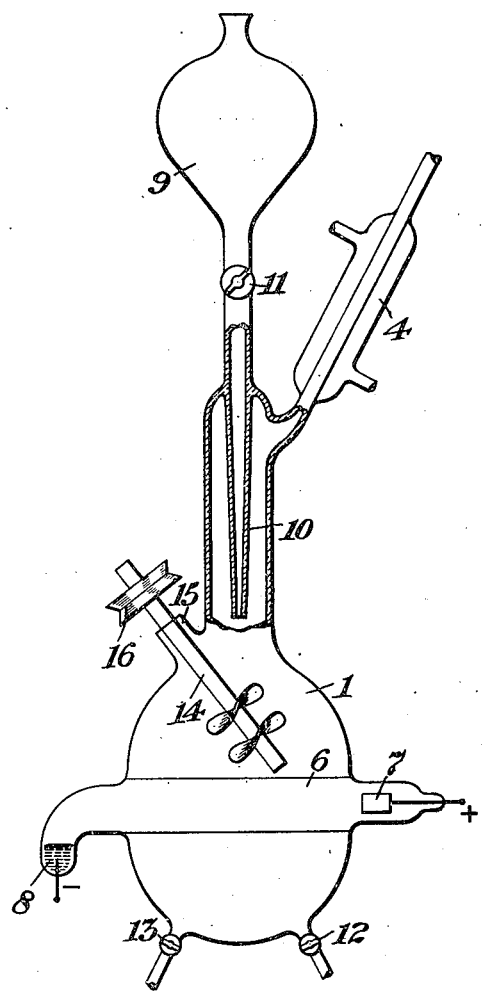

I have found certain forms of apparatus useful in carrying out these processes and will describe them in connection with the accompanying drawings in which Figure 1 shows a simple flask arranged to be operated upon; Fig. 2 shows a more elaborate and efficient apparatus and Fig. 3 an apparatus adapted for continuous operation.

In the first figure, 1 is a flask of quartz containing the mixture to be acted upon; 2 is a cork or closing plug; 3 is a vent tube and 4 a condenser which condenses vapors arising from the materials within the flask and permits them to return to the flask as liquid through the action of gravity. The materials to be acted upon, 5, are assembled in the flask which is exposed to the influence of a mercury vapor quartz tube of the well known type. As quartz is transparent to the radiations from this source, it will transmit its influence within the flask and permit the procedure of the reaction.

In Fig. 2 I show at 1 an enlarged quartz vessel, having formed integral therewith a mercury vapor tube, 6, also having walls of quartz and supplied with electrodes 7 and 8 outside the flask 1. I provide a vent, 3, a condenser, 4, as in Fig. 1, but also furnish a reservoir, 9, for one of the ingredients, say bromin, which is fed into the flask, 1, through the passage, 10, and which is controlled by the cock, 11. I also provide inlets and outlets, 12 and 13, at the bottom of the flask for other ingredients. It is desirable that the material be thoroughly mixed to secure complete and uniform reaction and to bring all of the material under the influence of the radiation, so I furnish a stirring rod or paddle, 14, carried out through a stuffing box, 15, in the wall of the flask, 1, and provided with a pulley or other driving mechanism at 16.

When, now, current is passed through the mercury vapor device, 6, the catalyzing radiations are produced and the charge, for example, of toluene and halogen begins to react as already explained. When this charge has been acted upon it may be removed and a fresh charge treated, the paddle, 14, being kept in motion if desired during this process. Any vapors which may appear will seek the vent, 3, and there will be condensed on the walls of the vent which are cooled by the condenser, 4, and will trickle back into the main body of the flask.

In Fig. 3, 17 is the tubular portion of the mercury vapor apparatus having a quartz container, an anode 18, a mercury cathode, 19, and a starting anode 20. I surround this vapor apparatus with a jacket, 21, having an inlet, 22, and an outlet, 23, and a vent, 3, and a condenser, 4, therefor. I may also, when desired, surround the tube, 17, with a jacket, 25, which jacket may be exhausted, if desired. All the parts so far described, except the electrodes, may be made of quartz.

This apparatus is adapted to continuous operation. The ingredients to be acted upon, suitably mixed, as for example, a halogen mixed with a hydrocarbon, are fed in at the inlet, 22, and pass at a suitable velocity up and around the tube, 17, being acted upon as they pass by the radiations produced by the current and finally are delivered to the outlet, 23, with the chemical reaction complete. With the vacuum jacket around the tube, 17, the liquids passing through the jacket, 21, are protected from the heat produced during the operation of the current between the electrodes, 18 and 19. The condenser, 4, and the vent, 3, act as in the system shown in the other drawings.

I wish it understood that my invention is not limited to the use of quartz for the container of the vapor electric apparatus, nor for the apparatus containing the liquid to be operated upon, but any material transparent to the particular emanations or radiations relied upon may be substituted therefor. Neither do I limit myself to a mercury vapor apparatus as a source of catalyzing radiation for I may use other forms of electric discharges or any other source of suitable radiations such as may serve in any particular case.

My method may be used where a hydrocarbon is to be acted upon by an element or a mixture of elements, especially the halogens for its applicability is very general. Neither do I wish to limit myself to liquids for gaseous materials and even solids may be acted upon by the same means and, where similar results are obtained by equivalent means, they fall within the scope of my invention.

This application is a division of my application Serial Number 781,049, filed July 25th, 1913.

I claim as my invention:

1. The method of catalyzing a chemical reaction, which consists in subjecting a reaction mixture to actinic rays from a source which generates more heat than desired for the reaction and protecting the reaction mixture from undue heating by a vacuum chamber interposed between the source and the reaction mixture.

2. The method of increasing the speed of operation of a catalyzing apparatus which consists in subjecting a reaction mixture therein to actinic rays from a source which generates more heat than desired for the reaction and protecting the reaction mixture from undue heating by a vacuum chamber interposed between said source and said mixture.

Signed at New York in the county of New York and State of New York this 7th day of January A. D. 1914.

FREDERICK G. KEYES.

Witnesses:
Wm. H. Capel,
Thos. H. Brown.